US012522490B2

(12) United States Patent
Graham et al.

(10) Patent No.: US 12,522,490 B2
(45) Date of Patent: Jan. 13, 2026

(54) INTEGRALLY FORMED AERIAL PLATFORM

(71) Applicant: Altec Industries, Inc., Saint Joseph, MO (US)

(72) Inventors: Austin Graham, Saint Joseph, MO (US); Ryan J. McKinney, Parkville, MO (US); Jacob Franck, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 828 days.

(21) Appl. No.: 17/853,327

(22) Filed: Jun. 29, 2022

(65) Prior Publication Data

US 2023/0002207 A1 Jan. 5, 2023

Related U.S. Application Data

(60) Provisional application No. 63/217,034, filed on Jun. 30, 2021.

(51) Int. Cl.
*B66F 11/04* (2006.01)

(52) U.S. Cl.
CPC .................................. *B66F 11/044* (2013.01)

(58) Field of Classification Search
CPC ............................ B66F 11/046; B66F 11/044
See application file for complete search history.

(56) References Cited

U.S. PATENT DOCUMENTS

| | | | | | |
|---|---|---|---|---|---|
| 3,414,079 | A * | 12/1968 | Wacht | B66F 11/044 | 182/222 |
| 3,625,305 | A * | 12/1971 | Mueller | B66F 11/044 | 182/2.4 |
| 3,642,096 | A * | 2/1972 | Valentine | B66F 11/044 | 182/2.11 |
| 4,763,755 | A * | 8/1988 | Murray | B66F 11/044 | 182/2.2 |
| 4,883,145 | A * | 11/1989 | Deltatto | B66F 11/044 | 182/2.4 |
| 5,944,138 | A * | 8/1999 | Vollmer | B66F 11/044 | 182/2.1 |
| 6,470,999 | B1 * | 10/2002 | Schanzle | B66F 11/044 | 182/2.1 |
| 8,708,177 | B2 * | 4/2014 | Roberts | B29C 35/049 | 182/2.4 |
| 10,822,216 | B2 | 11/2020 | McKinney et al. | | |
| 2017/0174489 | A1 | 6/2017 | Jeter et al. | | |
| 2017/0356595 | A1 * | 12/2017 | McKinney | B66F 11/04 | |

(Continued)

*Primary Examiner* — Paola Agudelo
(74) *Attorney, Agent, or Firm* — Erise IP, P.A.

(57) ABSTRACT

An integrally formed aerial support platform is described herein. The aerial support platform is formed from a thermoplastic composite including continuous reinforcement fibers, allowing the aerial support platform to be formed in one piece via compression molding, thereby decreasing the time and effort needed to produce each aerial support platform. An aerial support platform having increased longevity and increased stiffness-to-weight ratio is therefore produced. Furthermore, described is a process for producing an aerial support platform that substantially reduces the amount of volatile organic compound emissions and demonstrates improved recyclability when compared to traditional thermoset composite platforms.

20 Claims, 10 Drawing Sheets

(56) References Cited

U.S. PATENT DOCUMENTS

| | | | | |
|---|---|---|---|---|
| 2019/0285225 | A1 | 9/2019 | Scott et al. | |
| 2020/0346909 | A1 * | 11/2020 | McKinney | B66F 17/006 |
| 2021/0261770 | A1 * | 8/2021 | Elkovitch | C08J 5/10 |

* cited by examiner

INTEGRALLY FORMED AERIAL PLATFORM

CROSS-REFERENCES TO RELATED APPLICATIONS

This application relates to and claims priority from the following U.S. Patent Applications. This application claims priority to and the benefit of U.S. Provisional Patent Application No. 63/217,034, filed Jun. 30, 2021, which is incorporated herein by reference in its entirety.

BACKGROUND OF THE INVENTION

1. Field of the Invention

The present invention relates to aerial platforms, and more specifically to aerial platforms attached to the booms of service or maintenance vehicles.

2. Description of the Prior Art

It is generally known in the prior art to provide aerial platforms, or "buckets," attached to the boom of a service vehicle.

Prior art patent documents include the following:

U.S. Pat. No. 4,763,755 for Bucket release assembly for aerial device by inventor Murray, filed Jun. 3, 1987 and issued Aug. 16, 1988, discloses a release assembly for an aerial device for pivotally releasing a worker's bucket from an upright orientation to a horizontal orientation. The assembly consists of protrusions from the worker's bucket and a rotatable latch plate for selectively engaging and disengaging the protrusions.

U.S. Pat. No. 8,708,177 for In-situ foam core dielectrically-resistant systems and method of manufacture by inventor Roberts, filed May 3, 2012 and issued Apr. 29, 2014, discloses a dielectrically-resistant system includes a first component of a first plastic shell having opposed and spaced apart walls, defining a first cavity. The first plastic shell includes a first rib. Disposed within the first cavity is a first in-situ foam core including expanded polymer beads. The first in-situ foam core has a thermal bond with the first plastic shell. A second plastic shell and in-situ foam core component essentially mirroring the first component is connected to the first component by a connection. The dielectrically-resistant system is capable of resisting an electric potential difference of at least 50 kV.

U.S. Pat. No. 4,883,145 for Ergonomic aerial basket by inventor Deltatto, filed Jan. 25, 1989 and issued Nov. 28, 1989, discloses a simple apparatus that reduces the risk of low-back injury to workers in elevated, partially enclosed, aerial baskets. The preferred embodiment basically comprises a circular well within the floor of the basket that is surrounded by a raised footrest platform adapted to receive on foot of the worker. Between the footrest platform and a base of the well is a cylindrical wall that prohibits forward movement under the footrest platform. In operations, when the worker has to perform manual handling tasks outboard of the basket, one foot is raised out of the well and extended forward onto the footrest platform, while the other foot remains below and behind the raised foot, on the base of the well. The worker has thereby adopted a forward leaning posture instead of a forward bending posture. Consequently, the worker retains the optimal curvature of the spine, while achieving a biomechanical advantage that reduces the work demand on the lower back.

US Patent Publication No. 2017/0174489 for Safety step by inventors Jeter et al., filed Dec. 15, 2016 and published Jun. 22, 2017, discloses a step for safety buckets and other machinery and structures where slippage and/or electrical conductivity can be an issue. Additionally, a method of construction the step is disclosed. The step comprises a base portion and a series of projections. The base portion is substantially flat and has an upper surface and a lower surface. The series of projections extends upward from said upper surface. The base portion and the projections are formed of a material that is rigid and non-conductive.

US Patent Publication No. 2019/0285225 for Connection assembly by inventors Scott et al., filed Mar. 19, 2019 and published Sep. 19, 2019, discloses a connection assembly for use in an elevated work platform, the connection assembly comprising a connection member, the connection member including a connection portion adapted for connection to one or more attachment portions located on a surface of the elevated work platform, and a retention portion, the retention portion being adapted for removable connection to a retention member, the retention member further comprising an object retention portion adapted to retain one or more objects.

U.S. Pat. No. 10,822,216 for Modular rib for elevating platform by inventors McKinney et al., filed Aug. 25, 2017 and issued Nov. 3, 2020, discloses a mounting rib for an elevating platform, the rib designed and configured to insert through a slot in the sidewall of the elevating platform. The rib is composed of a T-shaped and two L-shaped components, wherein the T-shaped component inserts through the slot and the L-shaped components are attached on the exterior of the platform. Also, a corner-mounted rib for an elevating platform.

US Patent Publication No. 2020/0346909 for Modular rib by inventors McKinney et al., filed Jul. 22, 2020 and published Nov. 5, 2020, discloses a rib for an elevating platform, the rib designed and configured to insert through a slot in the sidewall of the elevating platform. The rib includes an internal rib component and an external rib component, wherein each of the components include at least an arm and a stem. The rib is operable to support an external load, such as an attached apparatus.

SUMMARY OF THE INVENTION

The present invention relates to aerial platforms, and more specifically to aerial platforms attached to the booms of service or maintenance vehicles.

It is an object of this invention to provide an aerial support platform formed using fiber-reinforced thermoplastic material.

In one embodiment, the present invention is directed to an aerial support platform, including a front panel, a back panel, a left panel, a right panel, and a base, wherein the front panel is connected to the left panel, the right panel, and the base by rounded corner sections, wherein the back panel is connected to the left panel, the right panel, and the base by rounded corner sections, wherein the front panel, the back panel, the left panel, the right panel, the base, and the rounded corner sections include a fiber-reinforced thermoplastic material, and wherein the front panel, the back panel, the left panel, the right panel, the base, and each of the rounded corner sections are integrally formed.

In another embodiment, the present invention is directed to an aerial support platform, including a front panel, a back panel, a left panel, a right panel, and a base, wherein the front panel is connected to the left panel, the right panel, and the base, wherein the back panel is connected to the left panel, the right panel, and the base, wherein the front panel, the back panel, the left panel, the right panel, the base, and the rounded corner sections include a fiber-reinforced thermoplastic material, wherein the front panel, the back panel, the left panel, the right panel, and the base are integrally formed, and wherein the aerial support platform is compression molded as a single part.

In yet another embodiment, the present invention is directed to an aerial support platform, including a front panel, a back panel, a left panel, a right panel, and a base, wherein the front panel is connected to the left panel, the right panel, and the base, wherein the back panel is connected to the left panel, the right panel, and the base, wherein the aerial support platform includes a single, integrally formed inner layer forming the inner surface of the front panel, the back panel, the left panel, right panel, and the base, wherein the front panel, the back panel, the left panel, the right panel, and/or the base of the aerial support platform includes one or more outer reinforcement layers attached to an outside surface of the single, integrally formed inner layer, and wherein the front panel, the back panel, the left panel, the right panel, the base, and the rounded corner sections include a fiber-reinforced thermoplastic material.

These and other aspects of the present invention will become apparent to those skilled in the art after a reading of the following description of the preferred embodiment when considered with the drawings, as they support the claimed invention.

DETAILED DESCRIPTION

Figure 1:
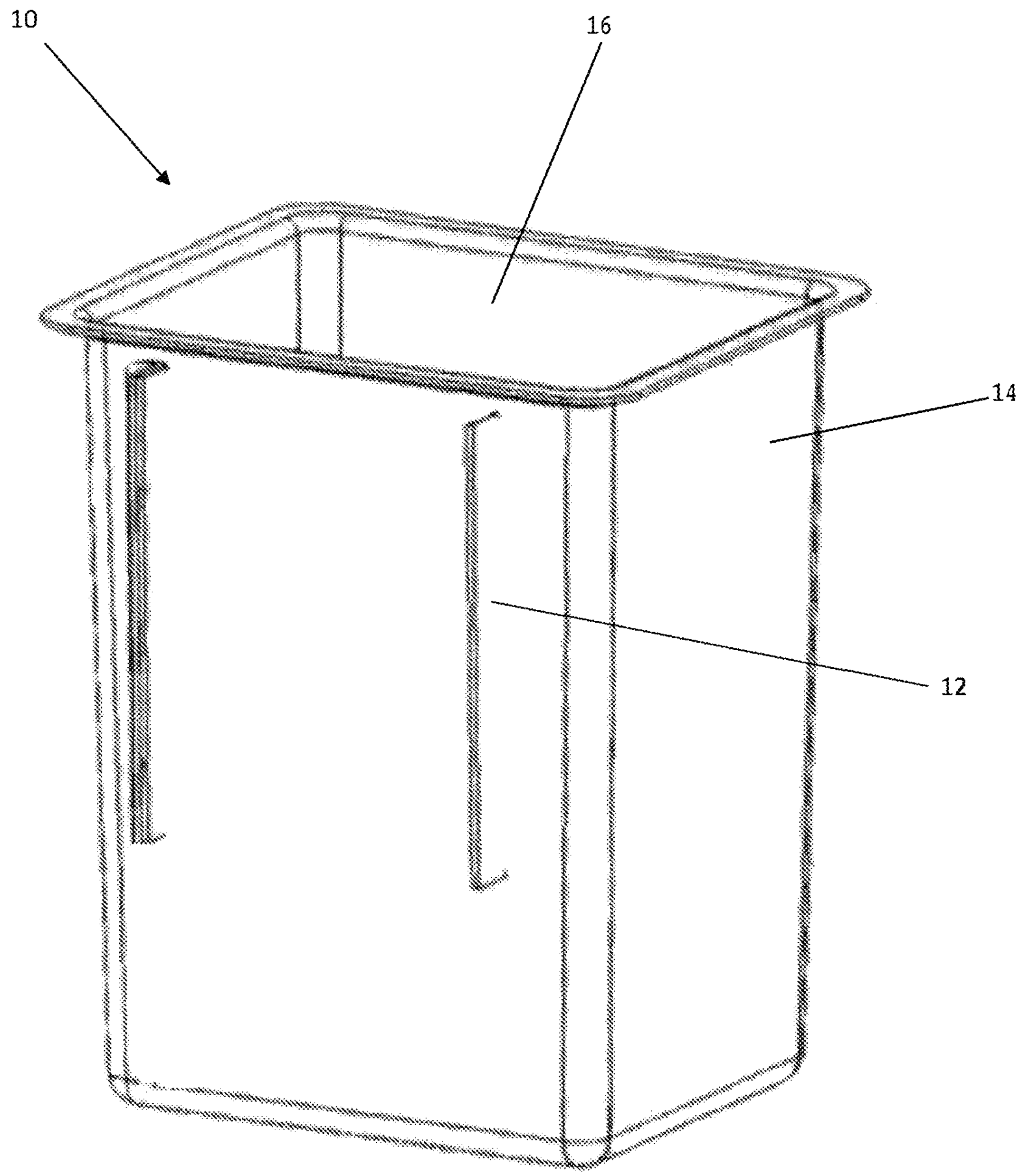
FIG. 1 is an isometric view of an aerial support platform according to one embodiment of the present invention.

The present invention is generally directed to aerial platforms, and more specifically to aerial platforms attached to the booms of service or maintenance vehicles.

It is an object of this invention to provide an aerial support platform formed using fiber-reinforced thermoplastic material.

In one embodiment, the present invention is directed to an aerial support platform, including a front panel, a back panel, a left panel, a right panel, and a base, wherein the front panel is connected to the left panel, the right panel, and the base by rounded corner sections, wherein the back panel is connected to the left panel, the right panel, and the base by rounded corner sections, wherein the front panel, the back panel, the left panel, the right panel, the base, and the rounded corner sections include a fiber-reinforced thermoplastic material, and wherein the front panel, the back panel, the left panel, the right panel, the base, and each of the rounded corner sections are integrally formed.

In another embodiment, the present invention is directed to an aerial support platform, including a front panel, a back panel, a left panel, a right panel, and a base, wherein the front panel is connected to the left panel, the right panel, and the base, wherein the back panel is connected to the left panel, the right panel, and the base, wherein the front panel, the back panel, the left panel, the right panel, the base, and the rounded corner sections include a fiber-reinforced thermoplastic material, wherein the front panel, the back panel, the left panel, the right panel, and the base are integrally formed, and wherein the aerial support platform is compression molded as a single part.

In yet another embodiment, the present invention is directed to an aerial support platform, including a front panel, a back panel, a left panel, a right panel, and a base, wherein the front panel is connected to the left panel, the right panel, and the base, wherein the back panel is connected to the left panel, the right panel, and the base, wherein the aerial support platform includes a single, integrally formed inner layer forming the inner surface of the front panel, the back panel, the left panel, right panel, and the base, wherein the front panel, the back panel, the left panel, the right panel, and/or the base of the aerial support platform includes one or more outer reinforcement layers attached to an outside surface of the single, integrally formed inner layer, and wherein the front panel, the back panel, the left panel, the right panel, the base, and the rounded corner sections include a fiber-reinforced thermoplastic material.

None of the prior art discloses an aerial support platform that is integrally formed as a single part. Aerial support platforms are typically formed either as large rectangular, metal platforms, or as smaller bucket-type platforms formed from a thermosetting composite. Non-bucket type platforms are most typically constructed as a series of metal bars welded together and connected to a solid metal or a mesh metal base. Bucket type platforms, on the other hand, are more common formed from a thermosetting glass fiber reinforced polymer, including epoxy or unsaturated polyester, first as separate pieces, which are subsequently connected together. Attaching steps, mounting plates, and/or ribs, for example, requires the use of an adhesive, which makes failure predictions for the part more difficult as the adhesive could last for significantly different lengths of time depending on the conditions in which the aerial support platform is used. It is therefore desirous to produce an integrally formed aerial support platform in order to increase longevity and predictability of the aerial support platform.

The lack of integrally formed bucket platforms is due in large part to the process typically used to form such bucket platforms. Because thermosetting polymers are used, a vacuum infusion process is most commonly used to form the parts. However, vacuum infusion comes with several drawbacks. First, vacuum infusion tends to be a slower process and more expensive, due in large part to the amount of set up time needed to place the vacuum bag around the mold before infusion. Operators must learn how to carefully place the dry fiberglass fabric into the tool without creating air pockets or wrinkles, which requires additional specialization and training time. It is especially difficult for manufacturing teams to indicate specific causes of defects forming in parts during vacuum infusion, which causes additional issues with consistency of parts and efficiency of manufacturing. Furthermore, vacuum infusion is inadequate for forming parts with more complicated geometries. Buckets, especially when they include elements protruding from an outside surface (e.g., attachment ribs, steps, etc.), are too complex to reasonably form using vacuum infusion methods. Even if the process does manage to produce a platform with integral elements protruding from the surface, cracking is an issue in these parts, especially near any drilled mounting holes, making them unideal or even inoperable for their intended purposes. Thus, previous inventions, such as that described in U.S. patent application Ser. No. 15/619,193, which is incorporated herein by reference in its entirety, have introduced modular, non-integral, ribs, in addition to other platform components, in order to reduce stress concentration on the platform. However, issues of stress concentration at the interface between aerial support platforms and attached elements is also obviated by integrally forming such aerial support platforms with the attached elements with thermoplastic materials.

Additionally, because bucket-type platforms have traditionally been formed from thermosetting polymers using vacuum infusion, the production of such platforms often releases volatile organic compounds (VOCs) such as styrene into the environment during the curing process. As styrene emissions are required to be controlled (such as by 40 C.F.R. 63), it is beneficial to develop a method able to substantially reduce or entirely eliminate the step of curing thermosetting polymers in order to minimize VOC production. In addition, unlike thermosetting polymers, many thermoplastic polymers are recyclable and could therefore be reused for future platforms or other purposes. Thus, the use of thermoplastic polymers in place of thermosetting polymers is useful both for regulatory compliance and for improving environmental impact.

Vacuum infusion is still used, in part, because buckets are required to be formed from materials having a sufficient stiffness-to-weight ratio and/or strength-to-weight ratio in order to have the buckets support a worker's weight and withstand impacts, while also being sufficiently lightweight so as to not require too much force to lift and/or carry the bucket. Materials currently known to have the required mechanical properties and which are commonly used in the industry are composites utilizing a thermoset matrix that, after being cured, are unable to be sufficiently worked into shapes such as buckets or components of buckets. Therefore, the thermosetting polymers need to be molded into the shape at the same time that they are cured with a process such as vacuum infusion. Curing often takes at least as long as eight hours for each part, and potentially up to two weeks, depending on the specific thermoset matrix being used. In order for thermoplastic polymers to undergo crosslinking, they simply need to be heated above a relatively low glass-transition temperature, while thermosetting polymers require the use of a catalyst in addition to greater temperatures and time to facilitate crosslinking. If a thermosetting polymer were to be used in a compression molding technique, the polymer would need to have high amounts of catalyst added and to be pressed for a much longer time. Continuing to use thermosetting materials with a compression molding process would thus not greatly increase production efficiency. Therefore, a system and method of producing aerial work buckets using alternative materials, such as fiber-reinforced thermoplastics, along with new production methods, such as compression molding, is needed in order to decrease cycle time, decrease cost, and increase efficiency of production.

Some individual parts for aerial support platforms are commonly formed through pultrusion processing. In pultrusion, strands of material are pulled through a two-dimensional die in order to form parts with consistent dimensions. However, this process results in fibers being aligned in a single direction, making the parts anisotropic and potentially susceptible to failure when subjected to less common loading regimes, such as when bumping up against an external object. Therefore, a method is needed to form aerial support platforms and related components such that they exhibit high strength when subjected to forces from different directions.

Referring now to the drawings in general, the illustrations are for the purpose of describing one or more preferred embodiments of the invention and are not intended to limit the invention thereto.

FIG. 1 is an isometric view of an aerial support platform according to one embodiment of the present invention. In one embodiment, an aerial support platform 10 includes at least one protrusion 12 extending outwardly from an outside surface 14 of the aerial support platform 10. In one embodiment, as shown in FIG. 1, the at least one protrusion 12 includes at least one rib for attachment to an aerial lift device. Other examples of protrusions include, but not are limited to, steps, hydraulic valve mounting plates, reinforcements, and/or hanging tool trays. The aerial support platform IO is able to be attached to any number of aerial lift devices, including but not limited to, scissor lifts, articulating boom lifts, telescopic boom lifts, vehicle attached boom lifts, and/or cherry pickers.

In one embodiment, the aerial support platform is formed from a thermoplastic composite, comprising a thermoplastic polymer matrix and continuous reinforcement fibers. In one embodiment, the thermoplastic polymer matrix includes low melting point polyethylene terephthalate (LPET) (or amorphous PET), polyethylene terephthalate glycol (PET-G), polycarbonate, acrylic, polyethylene, polypropylene, polyoxymethylene, and/or Nylon 6. In one embodiment, the continuous reinforcement fibers comprise insulating fibers and/or non-insulating fibers. By way of example, and not of limitation, in one embodiment, the continuous reinforcement fibers comprise E-glass, S-glass, Ultra-High Modulus Glass, carbon fiber, basalt fiber, and/or aramid fiber (e.g., poly-paraphenylene terephthalamide, polyphenylenediamine isophthalamide, etc.).

In one embodiment, the thermoplastic composite includes between about 1% and about 90% continuous reinforcement fibers by weight. In another embodiment, the thermoplastic composite includes between about 30% and about 80% continuous reinforcement fibers by weight. In yet another embodiment, the thermoplastic composite includes between about 50% and about 70% continuous reinforcement fibers by weight. In one embodiment, the thermoplastic composite includes between about 10% and about 90% continuous reinforcement fibers by volume. In another embodiment, the thermoplastic composite includes between about 20% and about 60% continuous reinforcement fibers by volume. In yet another embodiment, the thermoplastic composite includes between about 30% and about 50% continuous reinforcement fibers by volume.

In one embodiment, the continuous glass fibers are woven into a plain weave, a twill, and/or a satin pattern. In one embodiment, the woven continuous glass fibers include between about 4 threads per centimeter and about 15 threads per centimeter. In another embodiment, the woven continuous glass fibers include between about 6 threads per centimeter and about 10 threads per centimeter. In another embodiment, the thermoplastic composite is a unidirectional fabric, wherein the majority of the fibers extend in a substantially similar direction. In one embodiment, the density of the thermoplastic composite is between about 1.5 g/cm$^3$ and about 2.5 g/cm$^3$. In another embodiment, the density of the thermoplastic composite is between about 1.75 g/cm$^3$ and about 2 g/cm$^3$. In yet another embodiment, the density of the thermoplastic composite is between about 1.8 g/cm$^3$ and about 1.9 g/cm$^3$.

In one embodiment, the thermoplastic composite is formed using a thermoplastic tape (e.g., carbon fiber-reinforced tapes). Unidirectional thermoplastic tapes advantageously demonstrate very little shrinkage based on applied heat, unlike commingled fabrics. Additionally, unidirectional thermoplastic tape demonstrates improved rigidity and dielectric resistance when compared to woven fabrics, but is less suited for curved components. In one embodiment, layers of the thermoplastic tape are then thermally and/or ultrasonically welded to produce a multilayered fabric. In one embodiment, the continuous reinforcement fibers within each layer extend in substantially the same direction. In one embodiment, when the layers are combined to form a multilayered fabric, the fibers in more than one or all of the layers extend in the same direction. In another embodiment, when the layers are combined to form a multilayered fabric, each layer is angled so as to include fibers at approximately a preset angle (e.g., about 30°, about 45°, about 60°, about 90°, etc.) relative to the fibers in adjacent layers. By way of example, and not of limitation, in one embodiment, the multilayered fabric includes at least four layers, with the fibers being arranged in a 0/30/60/90 pattern. In one embodiment, one or more layers of the multilayered fabric include unreinforced thermoplastic tape.

In one embodiment, the continuous glass fibers are intertwined with polymer fibers using an air entanglement process or otherwise commingled to produce roving. The roving is then stitched and/or woven to produce a fabric sheet. In one embodiment, the roving is stitched together to produce a unidirectional sheet, in which all the roving is oriented in a parallel manner. Orienting roving in a parallel manner both increase the strength of the fabric, while using a woven pattern is useful for improving drapability of the polymer. In one embodiment, individual unidirectional sheets are stitched on top of each other so as to form a multilayered fabric. In one embodiment, the multilayered fabric includes at least three layers, with the fibers in each layer being laid at approximately a 45-degree angle relative to the fibers in adjacent layers (e.g., a −45/0/45 pattern). In another embodiment, the multilayered fabric includes at least four layers, with the fibers in each layer being laid at approximately a 45-degree angle relative to the fibers in adjacent layers (e.g., −45/90/0/45 pattern). It should be understood that the present application should not be understood to be limiting regarding the number of possible layers in the multilayered fabric, nor the relative orientation of the fibers within each layer. In one embodiment, different layers of the multilayered fabric are made using different roving comprising different polymers and/or different types of fiberglass. For example, one layer includes polycarbonate and carbon fiber in the roving, while other layers only include LPET and fiberglass. In another embodiment, multiple different polymers are commingled into a single roving. When the multilayered fabric is consolidated, the fabric's polymers are beneficially impacted from the combined properties of the constituent polymers. Beneficially, having fibers oriented in different directions helps to reduce issues of anisotropy in the aerial support platform and in components of the aerial support platform, ensuring higher strength and durability when the aerial support platform is subjected to multiple different loading regimes, as compared to pultruded components.

In one embodiment, a second set of composite material, including different types of continuous reinforcement fiber and/or different types of polymers, is connected to the fabric sheet via stitching, roving, weaving, knitting, thermal adhesion, and/or other attachment mechanisms. In one embodiment, the second set of composite roving is laid on top of the fabric sheet in order to produce a second layer of material. Producing a fabric with separate layers of material allows the compression molding process to produce a bucket-type platform having a liner 16 with different material. This allows, for example, the platform to have a liner 16 of highly electrically insulating material, while the bulk of the platform's strength comes from a material that would normally be more susceptible to electrical energy. In one embodiment, the liner 16 layer is formed from fiber reinforced or unreinforced low-density polyethylene (LDPE), polypropylene, polycarbonate, and/or other thermoplastic polymers. In another embodiment, the second set of composite roving is stitched, woven, knitted, thermal adhered, and/or otherwise attached adjacent to the fabric sheet, such that the two fabrics form a single larger fabric having different composite domains. Forming a fabric sheet with separate composite domains is particularly useful in the situation when there is a need for some parts of the platform to be made from, for example, a composite including a thermosetting polymer, while other parts of the platform are formed from a composite including a thermoplastic polymer. In one embodiment, one or more composite domains are formed from fabrics having different weave or stitch patterns. For example, in one embodiment, the fabric includes one domain of stitched, unidirectional fabric and another domain of woven fabric. Using compression molding, one is able to produce a platform comprising different areas of different material as a single integral platform. It will be appreciated that different layers and/or sections of the multilayered fabric are able to contain different thermoplastic polymers, such as low melting point polyethylene terephthalate (LPET) (or amorphous PET), polyethylene terephthalate glycol (PET-G), polycarbonate, acrylic, polyethylene, polypropylene, polyoxymethylene, and/or Nylon 6, and/or different types of reinforcement fibers, such as E-glass, S-glass, Ultra-High Modulus Glass, carbon fiber, basalt fiber, and/or aramid fiber (e.g., poly-paraphenylene terephthalamide, polyphenylenediamine isophthalamide, etc.).

Figure 2:
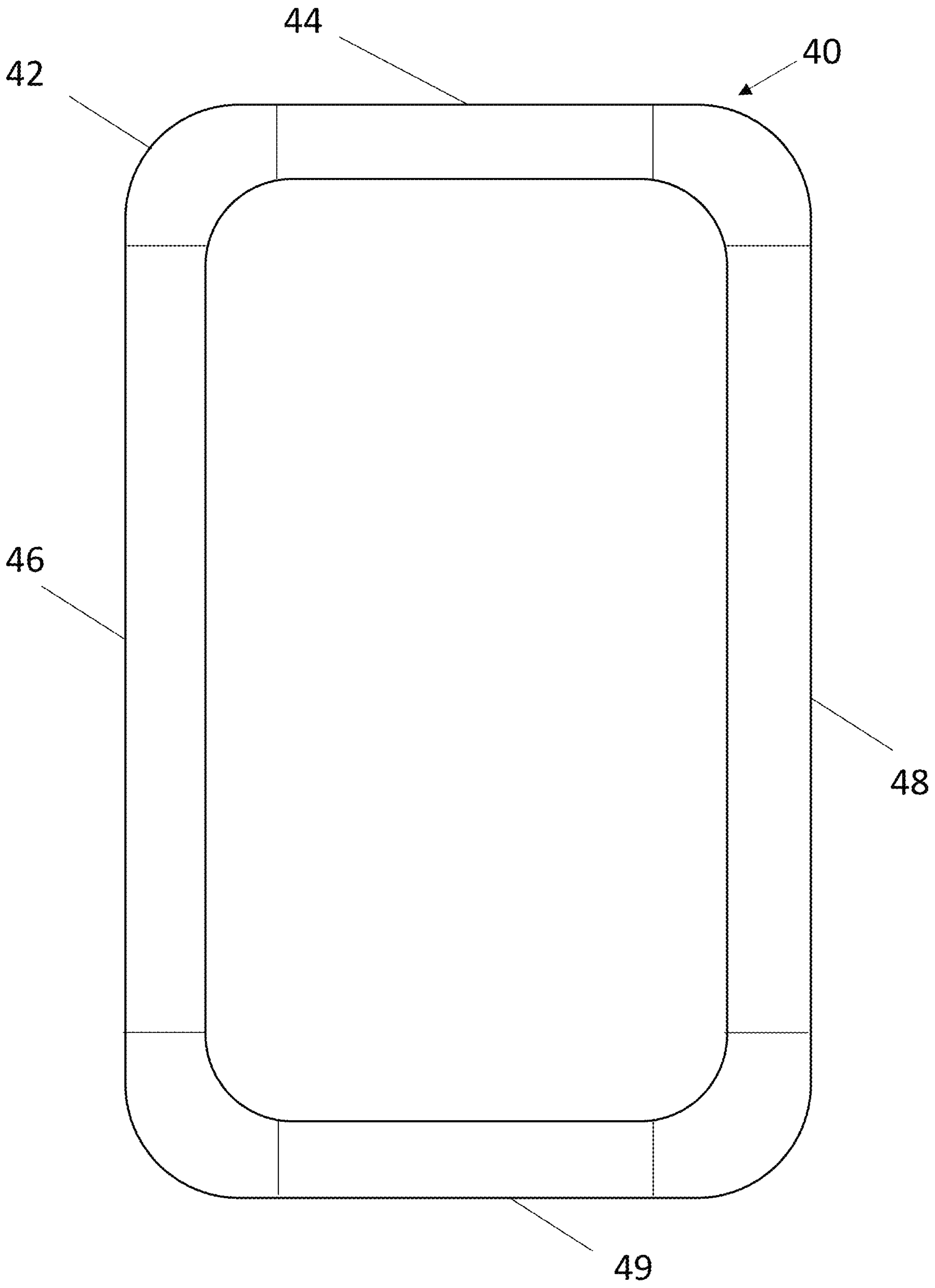
FIG. 2 is a top view of an aerial support platform according to one embodiment of the present invention.

FIG. 2 is a top view of an aerial support platform according to one embodiment of the present invention. In a first embodiment, an aerial support platform 40 is formed from separately bonded domains. For example, in one embodiment, the aerial support platform 40 includes a left side 46, a top side 44, a right side 48, a bottom side 49, and corner areas 42 connecting each side. In one embodiment, flat panel areas of the platform, such as the left side 46, the top side 44, the right side 48, and/or the bottom side 49 are formed from unidirectional thermoplastic tape, having improved structural resistance. However, woven fabrics have demonstrated better properties for non-flat areas of structures. Therefore, in one embodiment, the corner areas 42 of the platform are formed from woven carbon fiber fabrics.

Figure 3:
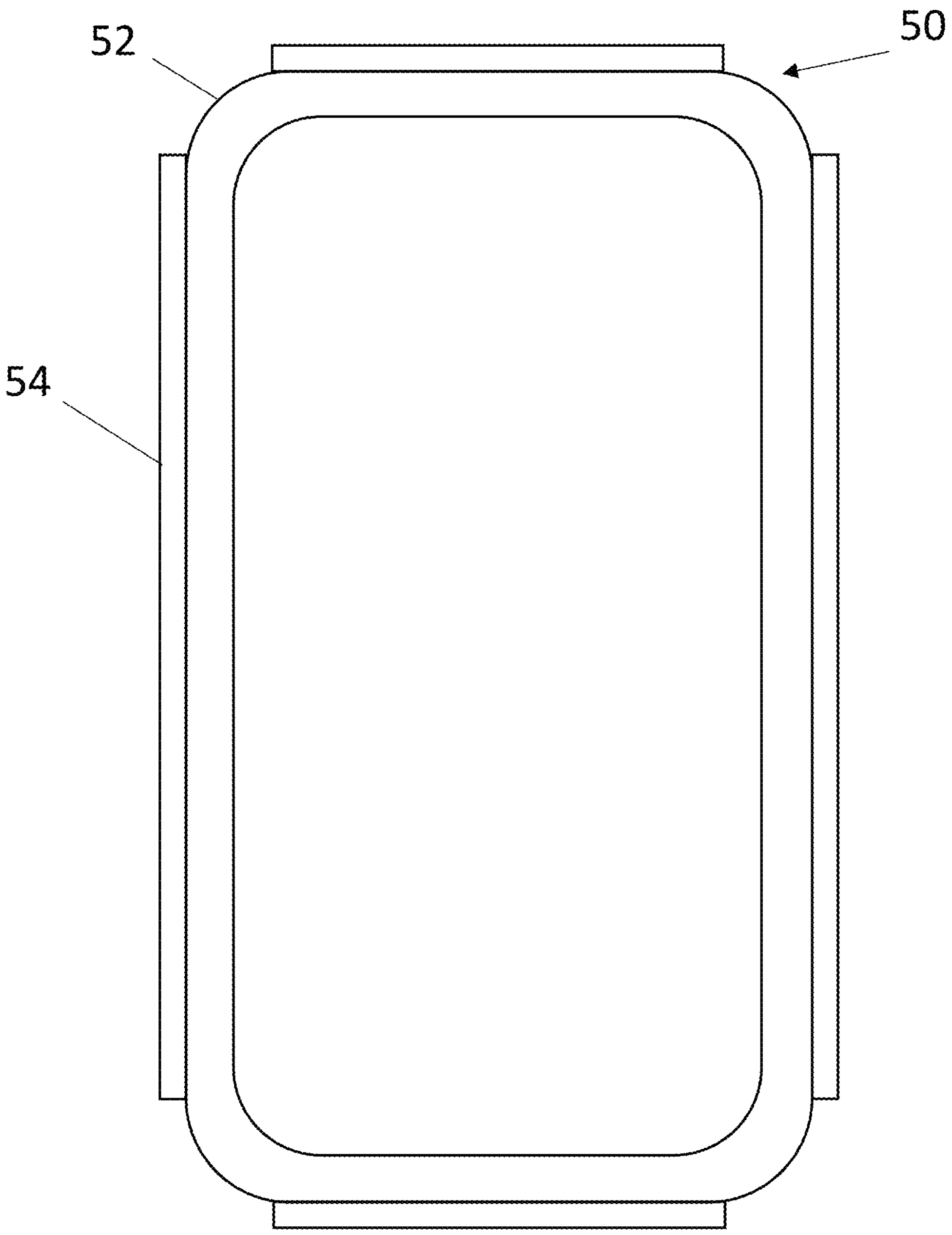
FIG. 3 is a top view of an aerial support platform according to one embodiment of the present invention.
Figure 4:
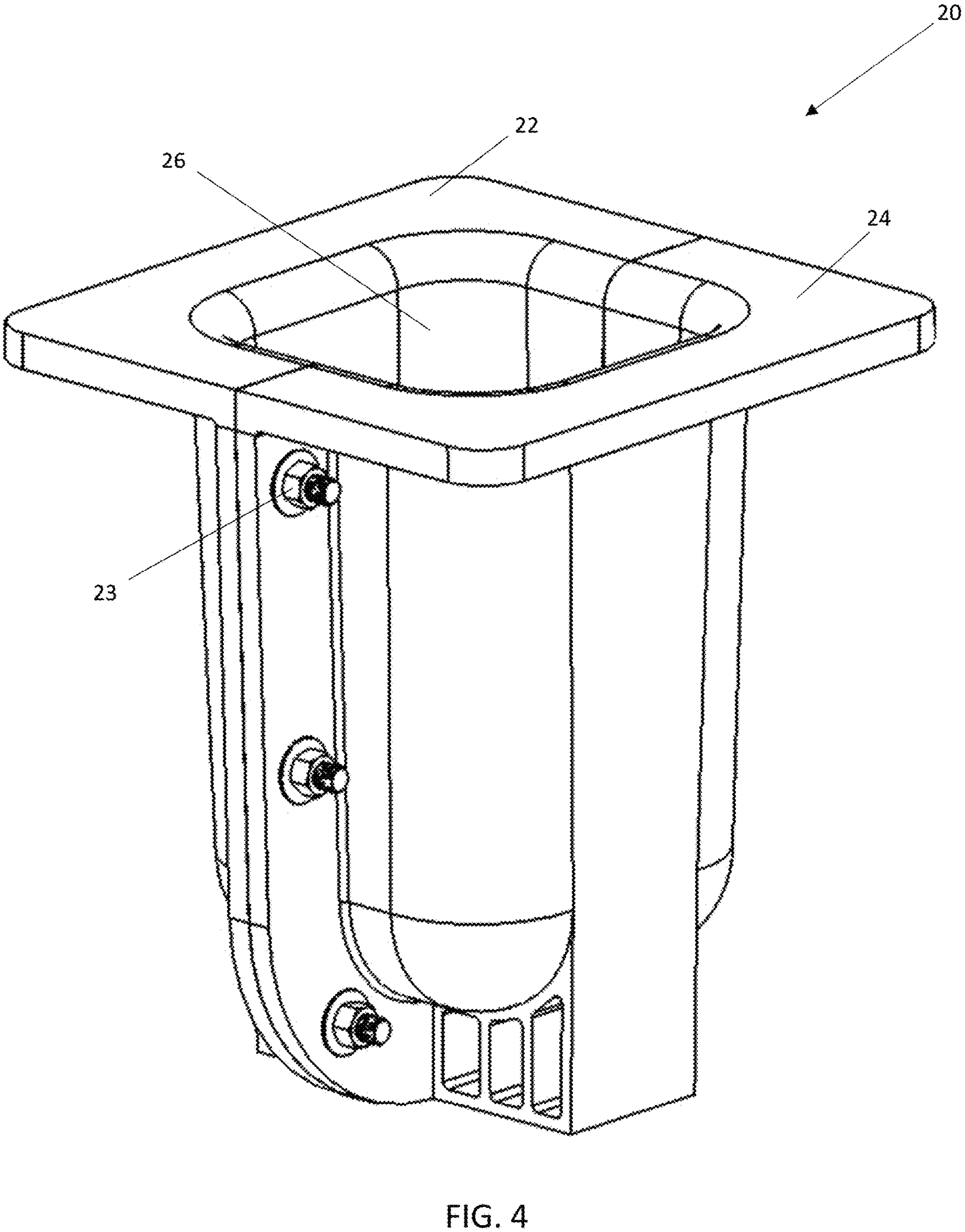
FIG. 4 is an isometric view of a female mold for manufacturing an aerial support platform according to one embodiment of the present invention.
Figure 5:
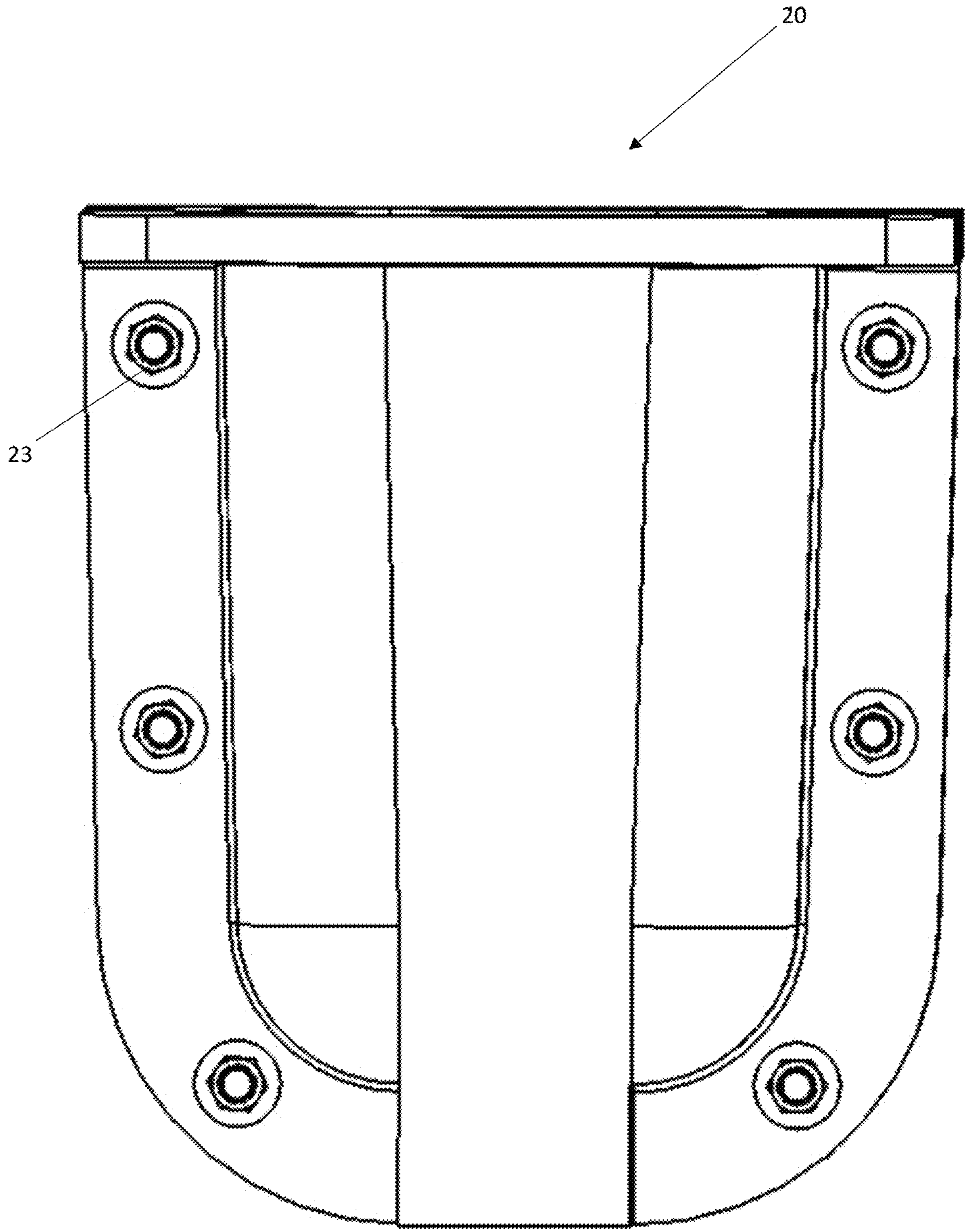
FIG. 5 is a front view of the female mold of FIG. 2.
Figure 6:
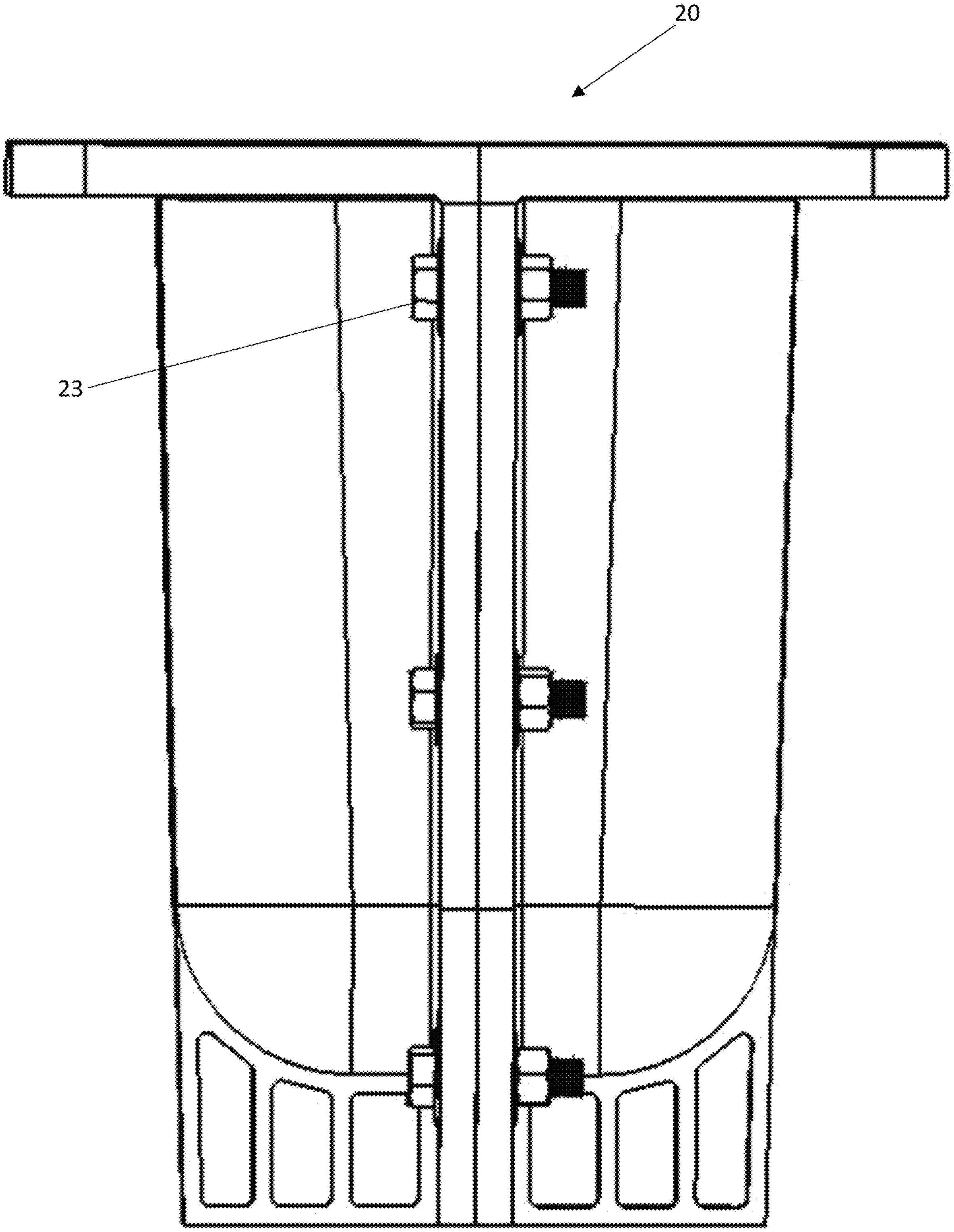
FIG. 6 is a side view of the female mold of FIG. 2.

FIG. 3 is a top view of an aerial support platform according to one embodiment of the present invention. In a second embodiment, the aerial support platform 50 includes an inner layer 52 reinforced by additional backing material 54 on one more sides of the platform 50. In one embodiment, the inner layer 52 includes a woven thermoplastic fabric, while the additional backing material 54 includes unidirectional thermoplastic tape for improved rigidity and dielectric resistance.

FIGS. 4-7 present different views of a female mold for manufacturing an aerial support platform according to one embodiment of the present invention. In one embodiment, the female mold 20 comprises a first segment 22 and a second segment 24, which are joined by at least one fastening element 23. In one embodiment, the at least one fastening element 23 is a bolt, screw, nail, latch, and/or any other fastening means. The female mold 20 includes a recess 26. By placing a fabric of composite material into the recess 26 of the female mold 20 and quickly compressing the female mold 20 against a male mold at high pressures, the composite fabric is consolidated to form a part, such as a bucket-type platform.

Figure 8:
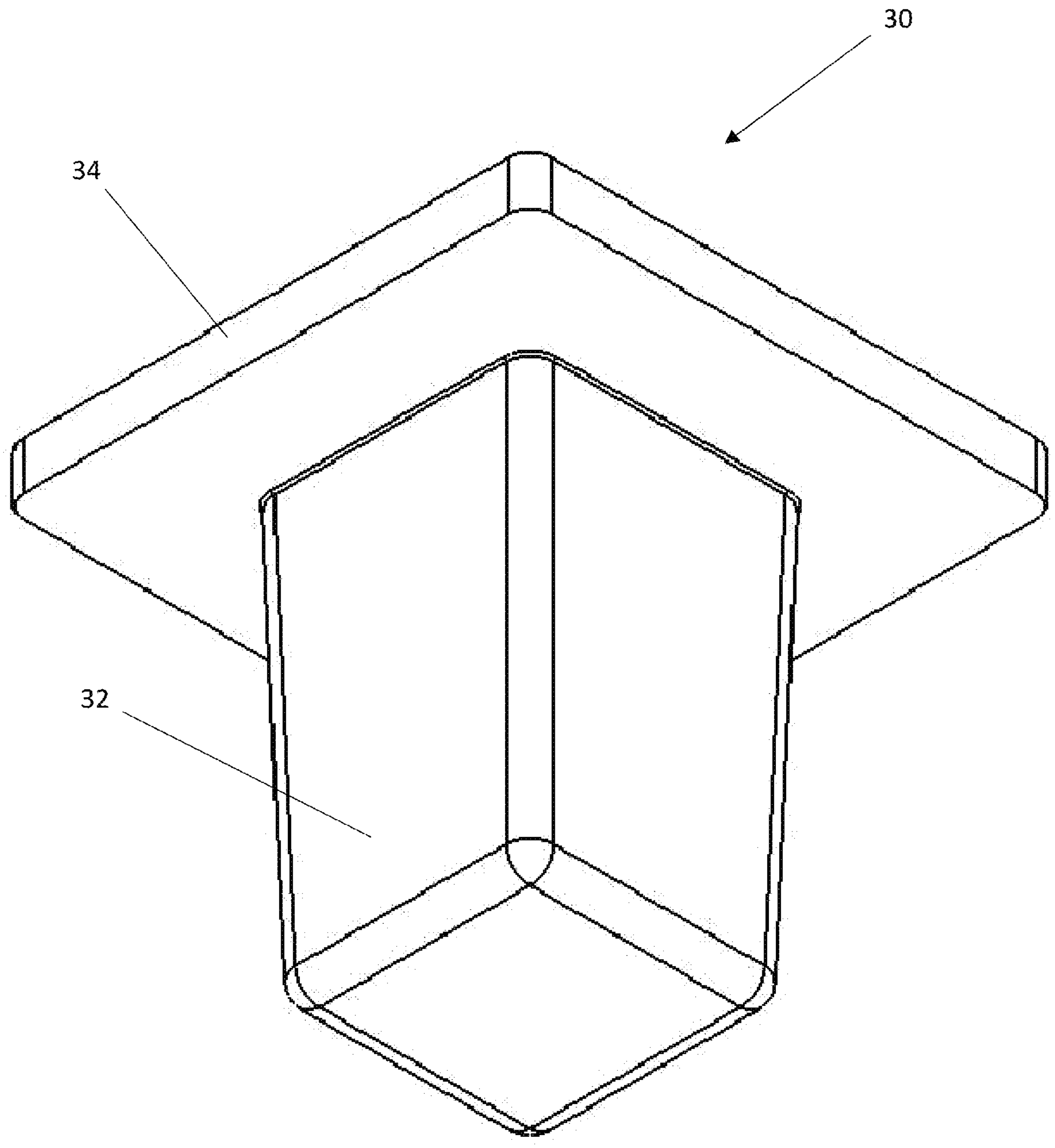
FIG. 8 is an isometric view of a male mold for manufacturing an aerial support platform according to one embodiment of the present invention.
Figure 9:
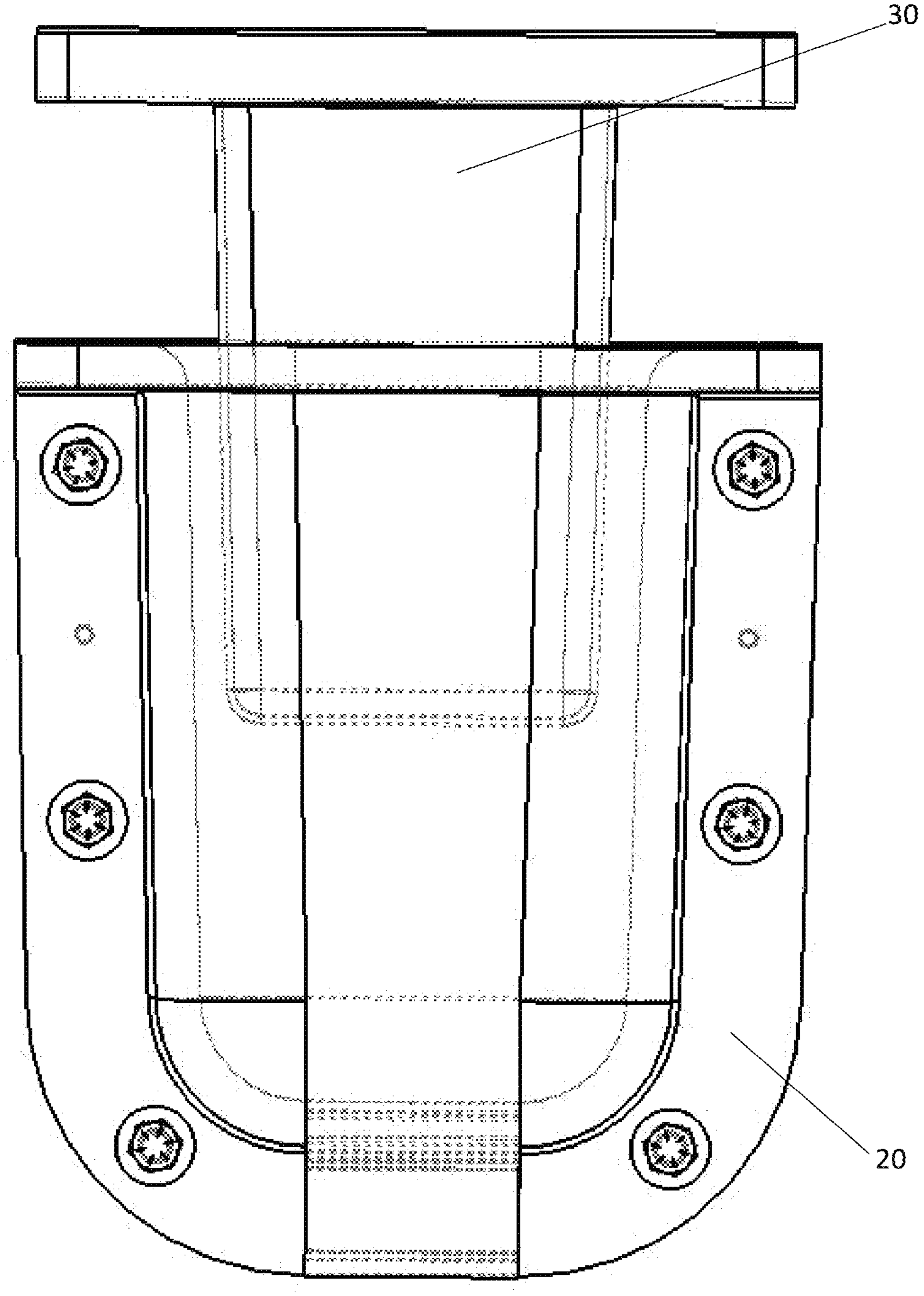
FIG. 9 is a side view of a female mold and male mold engaging during a compression molding process according to one embodiment of the present invention.

FIG. 8 is an isometric view of a male mold for manufacturing an aerial support platform according to one embodiment of the present invention. The male mold 30 includes a base 34 and a protrusion 32. The protrusion 32 is adapted to fit within the female mold 20, such that when the female mold 20 and the male mold 30 are joined, as shown in FIG. 9, any material between the two molds is highly compressed. In one embodiment, instead of the composite fabric being placed within the recess of the female mold 20 before compression, the fabric is draped over the protrusion 32 of the male mold 30. In one embodiment, at least one of the male mold or the female mold are heated before the compression process in order to help facilitate the consolidation process. In one embodiment, at least one of the male mold 30 or the female mold 20 includes an ejector pin used to remove any material compressed by the molds after the process is complete. It should be appreciated that the male and female molds shown in FIGS. 2-6 are not intended to be limiting and variations in the shape and size of the molds are able to be made to accommodate different shapes and sizes of aerial support platforms, as well as accommodate integrally forming different parts with the shell of the aerial support platform.

Figure 7:
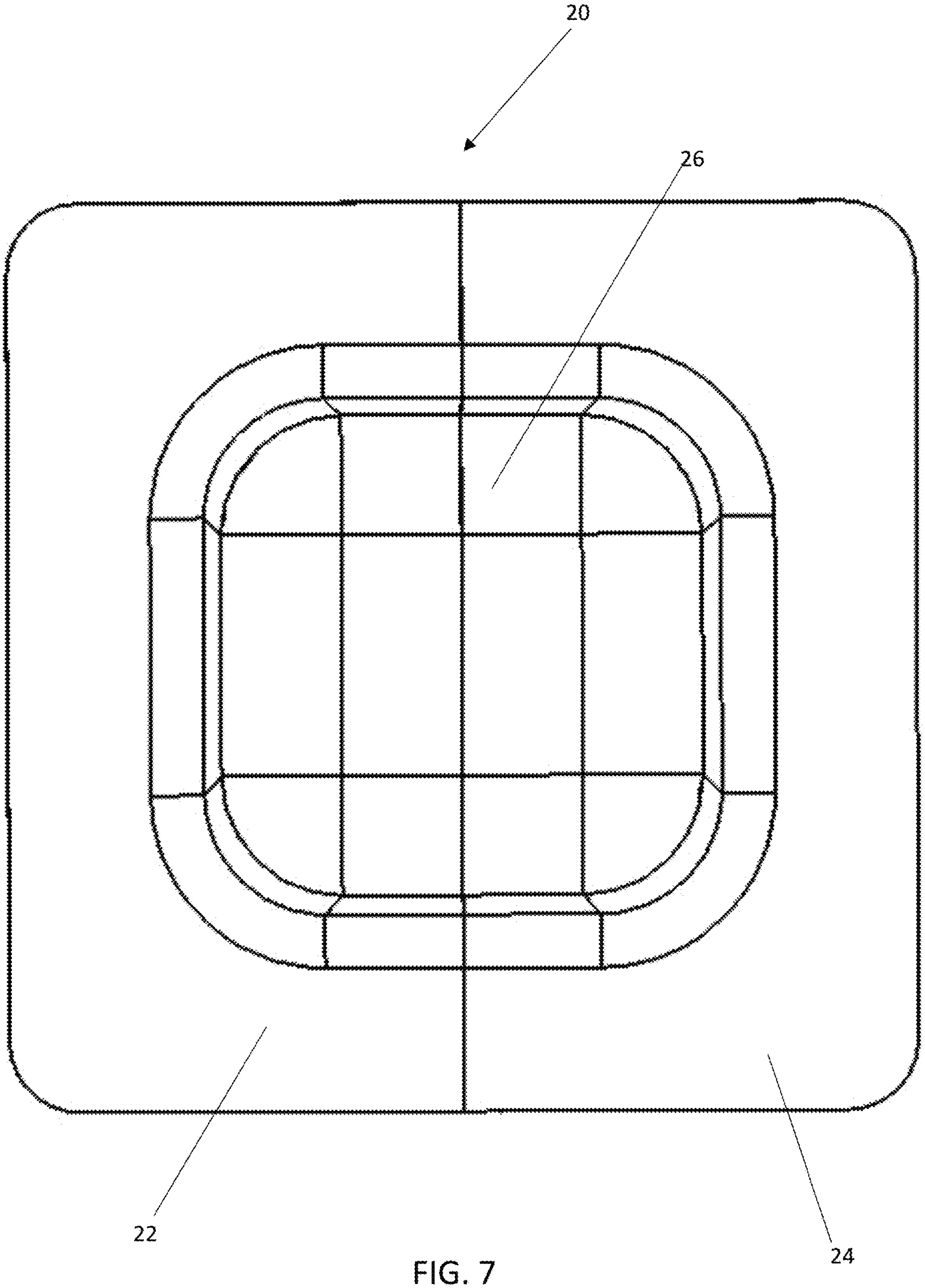
FIG. 7 is a top view of the female mold of FIG. 2.

When the female mold 20 and the male mold 30 are fully mated, as shown in FIG. 7, the charge of composite material consolidates and solidifies into a shaped part. In one embodiment, the shaped part is an integrally formed aerial support platform. An integrally formed aerial support platform with one or more protruding elements is able to withstand both greater shear and normal stresses without failure in the interface between the protruding element and the rest of the aerial support platform, when compared to bonding the protruding elements with an adhesive or by other chemical means to the platform. In one embodiment, the composite fabric is laid up within the female mold or on top of the male mold such that at least one domain comprising a composite including a thermosetting polymer forms at least one rib and/or at least one other type of platform segment of the platform during the consolidation process. In one embodiment, the at least one domain used to form a portion of the at least one rib and/or at least one other type of platform segment comprises a composite with a matrix including polyester, epoxy, polycarbonate, and/or acrylonitrile butadiene styrene (ABS). Forming the at least one rib and/or the at least one other type of platform segment from a thermosetting polymer is useful in preventing stress cracking at the interface between the rib or other type of platform segment and the rest of the platform.

In one embodiment, the composite fabric includes at least one domain to be formed into at least one slide pad. In one embodiment, the at least one domain used to form the at least one slide pad comprises a composite with a matrix including high density polyethylene (HDPE). In one embodiment, the composite fabric includes at least one domain to be formed into at least one impact bumper, at or near the corner of the platform and/or the edge of the at least one rib. In one embodiment, the at least one domain used to form the at least one impact bumper comprises a composite with a matrix including an ABS/PVC polymer, such as KYDEX FST. In one embodiment, the composite fabric includes at least one domain to be formed into at least one step. In one embodiment, the at least one domain used to form the at least one step comprises a composite with a matrix including polycarbonate and/or nylon. In one embodiment, the composite fabric includes at least one domain to be formed into at least one transparent window and/or transparent door. In one embodiment, the at least one domain used to form the at least one transparent window and/or transparent door comprises a composite with a matrix including polymethyl methacrylate (PMMA).

Figure 10:
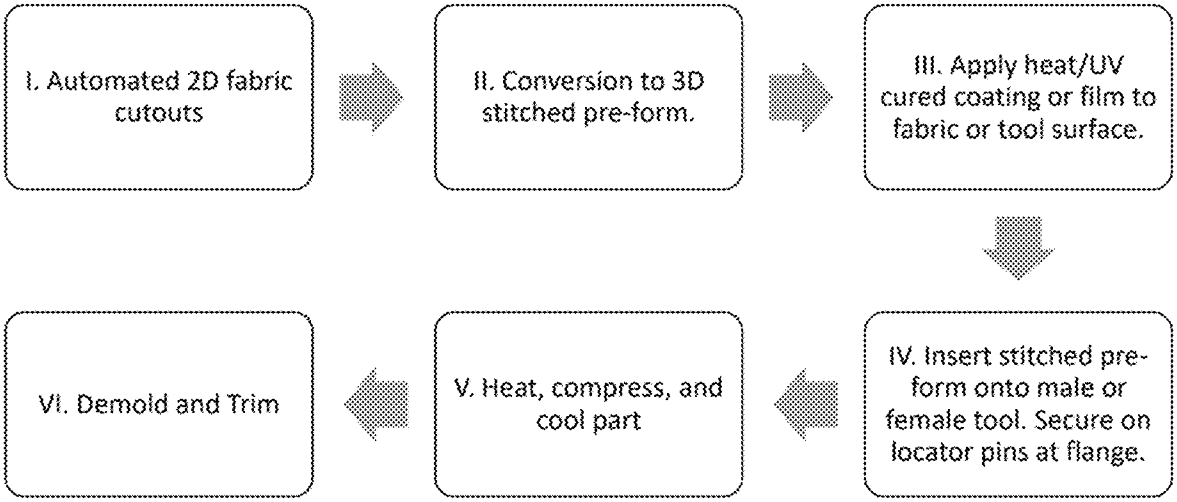
FIG. 10 is a diagram describing the process for making an aerial support platform according to one embodiment of the present invention.

FIG. 10 is a diagram describing the process for making an aerial support platform according to one embodiment of the present invention. As shown in FIG. 10, in one embodiment, the process for producing the aerial support platform includes (1) producing a 2D fabric of fiberglass and polymer fibers, (2) stitching the 2D fabric to form a 3D fabric structure, (3) heating and/or UV curing the 3D fabric structure and/or a compression molding tool, (4) placing the 3D fabric structure onto a male molding tool or into a female molding tool, (5) heating and compressing, then subsequently cooling the 3D fabric structure to produce a part, and (6) demolding and trimming the part to produce a final product. In one embodiment, the process further includes injection molding at least one composite having a thermoplastic matrix onto one or more areas of the final product. Injection molding helps to provide bulk to some areas of the platform, allowing the platform to have a better stiffness.

For the purpose of the present application, integrally formed means that a part is formed such that it makes up a single complete piece or unit. Integrally formed parts are not capable of being easily dismantled without destroying the integrity of the entire part. Additionally, integrally formed parts do not require the use of welding, adhesives, fasteners, and/or other attachment means in order to be held together. The present invention is not intended to be limited to forming partially integrally formed aerial support platforms or fully integrally formed aerial support platforms. For example, in one embodiment, a mounting plate is integrally formed with the aerial support platform, but ribs are attached to the platform separately. In another embodiment, all components of the platform are integrally formed.

The present invention is not intended to be limiting as to the processes able to form an integrally formed platform. For, in one embodiment, the platform is formed via any type of thermoforming process or other thermoplastic manufacturing process, such as injection molding, rotational molding, compression molding, compression molding using unidirectional tape, compression molding using sheet molding compound, compression molding using bulk molding compound, compression molding using thick molding, compression molding using wet molding, chop spray, gravity fed casting, low pressure casting, high pressure casting, resin transfer molding including light resin transfer molding, 3D printing, extrusion, Digital Light Synthesis (DLS) including Continuous Light Interface Production (CLIP), hand layup, flex molding, lamination, and/or squish molding.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. An aerial support platform, comprising:

a plurality of side panels and a base;

a plurality of rounded corner sections, each side panel from the plurality of side panels joined to at least two side panels of the plurality of side panels and the base via at least one rounded corner section of the plurality of rounded corner sections;

wherein the plurality of side panels, the base, and the plurality of rounded corner sections are integrally formed into a single part including an inner surface and an outer surface; and the single part formed by a multilayered fabric, the multilayered fabric comprising:

a first layer forming at least a first portion of the inner surface of the single part, the first layer comprising a first composite material, the first composite material comprising a first set of fibers extending in a first direction; and a second layer forming at least a second portion of the outer surface of the single part, the second layer comprising a second composite material, the second composite material comprising a second set of fibers extending in a second direction;

wherein the first composite material is different than the second composite material.

2. The aerial support platform of claim 1, wherein the second composite material comprises a unidirectional fiber-reinforced thermoplastic tape coupled to the outer surface of the single part.

3. The aerial support platform of claim 1, wherein each corner section of the plurality of rounded corner sections comprises a woven fiber-reinforced thermoplastic material.

4. The aerial support platform of claim 1, wherein the multilayered fabric comprises a fiber-reinforced thermoplastic material.

5. The aerial support platform of claim 4, wherein the fiber-reinforced thermoplastic material includes carbon fibers.

6. The aerial support platform of claim 4, wherein the fiber-reinforced thermoplastic material includes a polyethylene terephthalate glycol (PETG) matrix.

7. The aerial support platform of claim 1, wherein the first set of fibers of the first composite material are offset at a predetermined angle relative to the second set of fibers of the second composite material.

8. An aerial support platform, comprising:

a plurality of side panels and a base;

a plurality of rounded corner sections, each side panel from the plurality of side panels joined to at least two side panels of the plurality of side panels and the base via at least one rounded corner section of the plurality of rounded corner sections;

wherein the plurality of side panels, the base, and the plurality of rounded corner sections are integrally formed into a single part including an inner surface and an outer surface; and the single part formed by a thermoplastic material, the thermoplastic material comprising:

a first layer forming at least a first portion of the inner surface of the single part, the first layer comprising a first composite material, the first composite material comprising a first set of fibers extending in a first direction; and a second layer forming at least a second portion of the outer surface of the single part, the second layer comprising a second composite material, the second composite material comprising a second set of fibers extending in a second direction;

wherein the first composite material is different than the second composite material.

9. The aerial support platform of claim 8, further comprising:

one or more integrally formed parts protruding from the outer surface of the aerial support platform.

10. The aerial support platform of claim 9, wherein the one or more integrally formed parts comprises at least one or more ribs, one or more mounting brackets, or one or more steps.

11. The aerial support platform of claim 8, wherein the thermoplastic material comprises fiberglass fibers.

12. The aerial support platform of claim 8, wherein the first layer comprises:

a first section formed from a stitched, unidirectional fabric; and a second section formed from a woven fabric.

13. The aerial support platform of claim 8, wherein the first direction of the first set of fibers and the second direction of the second set of fibers is a same direction.

14. The aerial support platform of claim 8, wherein the first layer and the second layer are stitched together to form a multilayered fabric.

15. An aerial support platform, comprising:

a plurality of side panels and a base;

a plurality of corner sections, each side panel from the plurality of side panels joined to at least two side panels of the plurality of side panels and the base via at least one corner section of the plurality of corner sections;

wherein the plurality of side panels, the base, and the plurality of corner sections are integrally formed into a single part including an inner surface; and the single part formed by a multilayered fabric, the multilayered fabric comprising:

a first layer forming at least a portion of the inner surface of the single part, the first layer comprising a first composite material, the first composite material comprising a first set of fibers extending in a first direction; and a second layer comprising a second composite material, the second composite material comprising a second set of fibers extending in a second direction;

wherein the first composite material is different than the second composite material.

16. The aerial support platform of claim 15, wherein a first portion of the multilayered fabric forming the plurality of corner sections comprises at least one different material from a second portion of the multilayered fabric forming the plurality of side panels.

17. The aerial support platform of claim 15, wherein the multilayered fabric comprises thermoplastic polymer matrix and continuous reinforcement fibers.

18. The aerial support platform of claim 15, wherein the first composite material of the first layer comprises a plurality of insulating fibers.

19. The aerial support platform of claim 15, wherein the aerial support platform further comprises:
a protrusion integrally formed to at least one side panel of the plurality of side panels, the protrusion configured to attach the aerial support platform to an aerial lift.

20. The aerial support platform of claim 15, wherein at least one of the first composite material of the first layer or the second composite material of the second layer comprises a unidirectional thermoplastic tape.

* * * * *